United States Patent [19]

Goudy, Jr.

[11] 4,259,021
[45] Mar. 31, 1981

[54] FLUID MIXING APPARATUS AND METHOD

[75] Inventor: Paul R. Goudy, Jr., 8920 W. Hampton Ave., Milwaukee, Wis. 53225

[73] Assignees: Paul R. Goudy, Jr., Milwaukee, Wis.; Bruce J. Landis, Sunrise, Fla.; Kenneth J. Landis, Willoughby Hills, Ohio

[21] Appl. No.: 897,670

[22] Filed: Apr. 19, 1978

[51] Int. Cl.³ .................. B01F 11/02; B01F 15/06; B01F 5/06; F02M 29/00
[52] U.S. Cl. ................... 366/118; 123/25 B; 123/590; 366/144; 366/146; 366/338; 366/337
[58] Field of Search .............. 366/118, 340, 336, 144, 366/146, 341, 337, 338, 339, 108, 117, 120, 349; 123/25 R, 25 B, 25 D, 25 P, 141

[56] References Cited

U.S. PATENT DOCUMENTS

| | | | |
|---|---|---|---|
| 2,085,132 | 6/1937 | Underwood | 366/340 |
| 2,890,868 | 6/1959 | Potchen | 366/336 |
| 3,045,984 | 7/1962 | Cochran | 366/340 |
| 3,081,979 | 3/1963 | Lindsey | 366/340 |
| 3,278,165 | 10/1966 | Gaffney | 366/340 |
| 3,299,473 | 1/1967 | Rorer | 366/146 |
| 3,404,869 | 10/1968 | Arder | 366/341 |
| 3,417,967 | 12/1968 | Richens | 366/340 |
| 3,583,678 | 6/1971 | Hurder | 366/343 |
| 3,652,061 | 3/1972 | Douglas | 366/340 |
| 3,704,006 | 11/1972 | Grout | 366/340 |
| 3,746,216 | 7/1973 | Frederick | 366/340 |
| 3,751,009 | 8/1973 | Archer | 366/340 |
| 3,815,565 | 6/1974 | Stelter | 123/141 |
| 3,818,876 | 6/1974 | Voogd | 123/25 E |
| 3,827,888 | 8/1974 | Terwilliger | |
| 3,856,270 | 12/1974 | Hemker | 366/340 |
| 3,860,217 | 1/1975 | Grout | 366/340 |
| 3,923,288 | 12/1975 | King | 366/341 |
| 3,941,355 | 3/1976 | Simpson | 366/336 |
| 3,953,002 | 4/1976 | England | |
| 4,027,857 | 6/1977 | Cunningham | 366/340 |
| 4,043,539 | 8/1977 | Gilmer | 366/340 |

Primary Examiner—Robert W. Jenkins
Attorney, Agent, or Firm—Maky, Renner, Otto & Boisselle

[57] ABSTRACT

A compact mixing apparatus includes a housing and at least one motionless, although possibly vibrated, mixing element in the housing. The mixing element divides into plural streams fluid-like material flowing therethrough, at least twice relatively abruptly changes the flow direction of such streams and preferably imparts rotational momentum to the streams. A chamber in the housing permits generally turbulent mixing of such streams after they exit the mixing element. In accordance with the method of the invention fluid-like material delivered to a housing is divided into plural streams which have their flow directions changed at least twice, and the streams possibly also are rotated and are then combined in a relatively turbulent manner to form a well-mixed output. Moreover, a combustion engine system is disclosed using such a mixing apparatus to mix fuel with a supplemental fluid, with the combined material being delivered to such engine for combustion.

77 Claims, 14 Drawing Figures

_Fig. 1_

_Fig. 2_  _Fig. 3_  _Fig. 7_

_Fig. 8_

_Fig. 9_

FLUID MIXING APPARATUS AND METHOD

BACKGROUND OF THE INVENTION

The invention generally relates to mixing devices and particularly to those known as motionless mixers. The invention also relates to methods of mixing fluid-like materials and, in a particular embodiment, to a combustion engine system capable of producing a mechanical output in response to combustion of a combined fluid-like material input thereto.

The mixing of relatively stationary fluids, for example in a mixing container, may be carried out by a moving mixing blade or the like. Such movable mixers, however, are bulky, require large power inputs, and are difficult to adapt to use in fluid systems in which continuously flowing fluids are to be mixed. However, a number of so-called motionless mixers are available for the purpose, as disclosed, for example, in U.S. Pat. Nos. 3,923,288; 3,583,678 and 3,860,217. In the former patent a plurality of flow dispersing or interrupting elements are placed in a relatively long tubular housing to form a mixing matrix for turbulently mixing the fluid flowing therethrough. In the latter two patents the main flow stream through a relatively long tubular housing is divided into several discrete flow streams that flow through separate passageways. The positional relationship of the divided flow streams where they initially divide and where they exit the dividing elements is altered for enhanced variation in the interfacial surface contact between flow streams. Where the flow streams exit such a dividing element, they mix turbulently and then enter a further dividing element until finally the mixed fluid exits the device.

The known theory of stratification for interfacial surface generators, such as the one disclosed in U.S. Pat. No. 3,583,678, follows the equation $S = N(X)^Y$; where S is the stratification or number of individual strata produced by the mixing apparatus; N is the number of components being mixed; X is the number of streams produced by each dividing element of the mixing device; and Y is the number of dividing elements in the housing of the mixing apparatus. The larger the value S, the larger the number of strata produced by the mixing device and, accordingly, the more homogeneous is the mixture produced thereby.

The foregoing and other examples of motionless mixers for continuously flowing fluids are relatively large and cumbersome, relatively expensive, and in many cases unsatisfactory for producing long-lasting, homogeneous mixtures.

As used herein the term fluid of fluid-like means a material that is capable of flowing, such as, for example, a liquid, a gas, or even a solid that has satisfactory flow characteristics or is carried in a fluidic carrier; for example, such materials may be a pigment for mixing in a paint, a polymer being mixed to facilitate polymerization, etc. The present invention, however, although capable of and intended to effect mixing of various media, will be described in detail below with reference to the mixing of water and gasoline to form an emulsion that is consumed in a combustion engine.

In the past, one technique for combining water and gasoline or other combustible fuel to be burned in a combustion engine, such as in an aircraft engine, employed the direct injecting of small quantities of water into the fuel. However, as fas as is known by the applicant, no substantial mixing of the water and fuel was effected.

In present day combustion engines such as an internal combustion engine used in an automobile, it is common to burn an overly rich mixture, i.e. larger than the optimum fuel air mixture for complete combustion, so there is some unburned vapor remaining in the products exhausted from a cylinder. That unburned vapor provides an important function of cooling the exhaust products to avoid excessive damaging heat at the exhaust valve and/or rest of th exhaust system. For fuel economy, though, it would be desirable to burn an effectively leaner mixture having a lower percentage of fuel.

SUMMARY OF THE INVENTION

In accordance with the present invention a mixing apparatus mixes a fluid-like material comprised of a plurality of fluids by dividing such material into plural streams, changing the direction of each stream at least twice, preferably imparting rotational momentum to the streams, and then allowing the streams to mix generally turbulently. The present invention relates to both an apparatus and a method for effecting the foregoing. In the preferred embodiment each individually formed stream makes an initial right angle bend where it enters the mixing element of the mixing apparatus and is bent an additional right angle to exit the mixing element, itself in the housing of the apparatus, where it then turbulently engages the other streams in a mixing area. The streams also perferably are rotated and/or twisted at least once to impart rotational inertia thereto. Such disruption of each individual stream is obtained in the mixing element with effective mixing of the individual streams. The streams then mix well with other streams in the relatively open mixing chamber between adjacent mixing elements, for example. The several forms of mixing element, each including plural cooperative parts to form several flow paths, perform the mixing operation efficiently in a relatively small space. Moreover, the thorough mixing effected by the mixing apparatus appreciably reduces the possibility of stratification of the inlet streams intended for mixing.

In accordance with another aspect of the invention the mixing apparatus is employed in a combustion engine stream to produce a relatively long-lasting (generally greater than one minute) homogeneous emulsion of a fuel, such as gasoline, with water and/or other additives. The mixing apparatus produces such mixture upstream of the engine combustion chamber. The combustion engine produces a mechanical output in response to combustion of such mixture with a number of unexpected results being obtained, as described further below. It is believed that with the addition of from about ½% by volume to about 30% by volume of water to fuel and preferably from about ½% to about 7% by volume of water to fuel, the resulting mixture burned in the engine can be leaner than in the past allowing for a greater percentage of the fuel to be burned than in the past while the water vapor produced provides the cooling effect for the exhaust products mentioned above. The combination of the mixing apparatus with a combustion engine, a fuel supply, and a supplemental fluid supply, such as water, has a greater fuel efficiency and uniformity of engine operation than was previously attainable.

In accordance with still another aspect of the invention, one or more of the parts forming the mixing elements may be formed of an additive material that degrades into the fluid flowing therethrough. Therefore, as the fluid flows through the mixing element, the degrading of such material provides a controlled dispersion of such additive into the fluid.

Another aspect of the invention involves the applying of vibration or other mechanical motion to the mixing elements further to enhance the mixing efficiency of the mixing apparatus. Such vibrations may be of relatively low frequency of, for example, several hertz through the ultrasonic frequency range. Such vibrating in the ultrasonic range also may desirably effect a heating of the fluid material, which may be employed, for example, to enhance the combustion efficiency and/or to avoid freezing along the fuel flow lines, at the carburetor, etc. of an engine. Such vibration also may be employed to enhance the controlled degrading and delivery of additives described above.

Thermal energy also may be delivered, in accordance with the invention, to the fluid flowing through the mixing apparatus via a conventional electric resistance heating mechanism or by conventional microwave heating apparatus for enhanced combustion efficiency, for avoiding freezing, for expediting reactions, etc.

With the foregoing in mind, it is a primary object of the invention to provide a mixing apparatus and method that are improved in the noted respects.

Another object is to provide a combustion engine system that is improved in the mentioned respects.

An additional object is to improve the efficiency of a mixing apparatus, particularly one for continuous mixing of flowing fluids, for example by reducing the size, cost, and/or power requirements for the same, by improving the operational effectiveness, and the like.

A further object is to facilitate the controlled addition of additives to fluids.

Still another object is to mix plural continuously flowing fluids.

Still an additional object is to obtain a homogeneous and longlasting emulsion of plural fluids, such as of water and fuel, such as gasoline, and especially of immiscible fluids.

Still a further object is to increase the stratification of a continuously flowing fluid material to enhance the homogeneous nature thereof including both chemical homogeneity as well as thermal homogeneity.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be employed.

DESCRIPTION OF THE PREFERRED EMBODIMENTS

Figure 1:
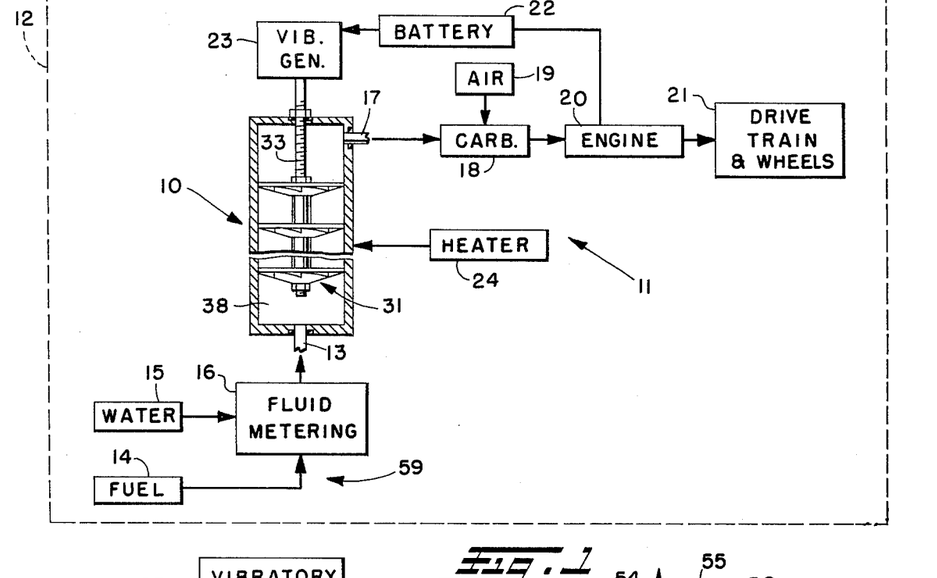
FIG. 1 is a schematic block diagram of a combustion engine system in accordance with the invention employed as the drive mechanism for a vehicle.

Referring now in detail to the drawings, wherein the same reference numeral designates like parts in several figures, a mixing apparatus 10 is illustrated in FIG. 1 as part of a combustion engine system 11 for a vehicle represented by the dotted outline 12. The mixing apparatus 10 has an inlet 13 into which metered quantities of plural fluids, in this case fuel, such as gasoline, from a fuel supply tank 14, and water from a water supply tank 15, are delivered by a fluid metering device 16, such as conventional fluid flow controlling devices including, for example, the vehicle fuel pump, not shown. It is the purpose of the mixing apparatus thoroughly to mix the fluid material received at the inlet 13. The thoroughly mixed material exits the mixing apparatus 10 at its outlet 17 as a homogeneous mixture, for example in the form of a well dispersed, relatively long-lasting emulsion of fuel and water. The effluent from outlet 17 is combined in a carburetor 18 with air from its supply 19, and that combination is provided to a combusjtion engine 20, such as a conventional internal combustion engine of an automobile. Although illustrated in connection with a combustion engine that ordinarily requires a carburetor 18, the mixing apparatus 10 of the invention similarly may be employed in an engine that uses full injection principles. In the engine 20 the inlet fluid material is burned, and the engine produces a mechanical output that is coupled, for example, via the drive train to the vehicle wheels, as represented at 21, to move the vehicle. The mechanical output from the engine 20 also is coupled to the vehicle battery 22, which performs the usual electrical functions in a vehicle.

Moreover, the battery 22 may be coupled, as shown, to a conventional vibratory generator 23, such as one of relatively low frequency type, say on the order of several hertz, even to a relatively high frequency ultrasonic type. The generator 23 effects vibratory motion in the mixing apparatus 10 further to enhance the mixing efficiency thereof. Moreover, a heater 24, such as a conventional electrical heater, a microwave energy generating heating apparatus, or the like, may be powered from the battery 22 via a connection, not shown, to heat the fluid flowing through the mixing apparatus 10. Such heating may be used, on the one hand, to enhance the combustion efficiency of the engine 20 by pre-heating the fluid supplied thereto and/or, on the other hand, to avoid freezing of the relatively high freezing-point water flowing through the mixing apparatus 10 and passing particularly through the carburetor 18.

The combination of water with the fuel in the combustion engine system 11 improves the fuel efficiency thereof. The water in the fuel provides the cooling function previously mentioned. The mixing apparatus assures a homogeneous mixture or emulsion of the fuel and water for uniformity of air combination therewith at the carburetor 18 and similarly uniform engine operation. This effective operation is in contrast to the past direct water injection where water was injected directly into the cylinder and too much water could cause mis-operation of the engine.

The mixing apparatus 10 may be used for mixing fluids other than fuel and water. For example, in the combustion engine system 11, other additives, such as methanol also may be mixed with the water and fuel further to avoid freezing and to enhance the dispersing of water in the fuel. Wetting agents and the like also may be included in the mixing fluids. The mixing apparatus 10, moreover, may be used in many other systems in which one or more fluids or fluid-like materials generally continuously flowing are to be mixed.

Figure 2:
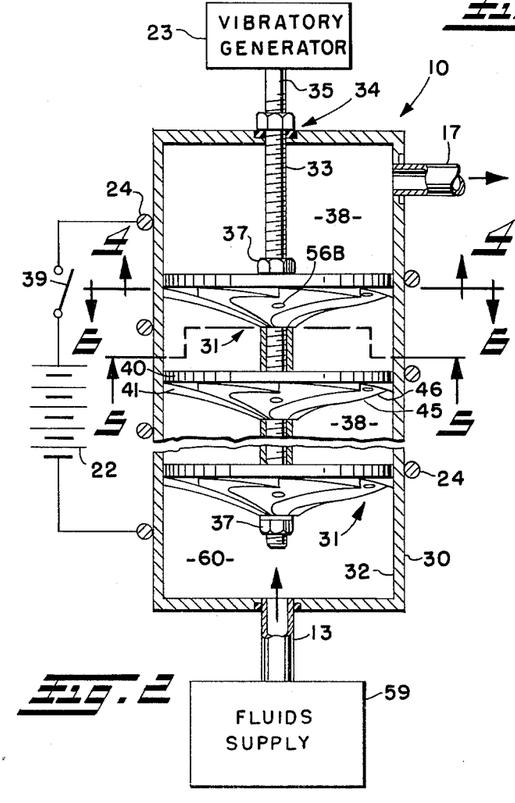
FIG. 2 is a side elevation view, partly broken away in section, of a mixing apparatus in accordance with the invention as used, for example, in the system of FIG. 1.

Turning now to FIG. 2, the mixing apparatus 10, shown enlarged, includes a housing 30 through which the fluid-like material flows and a plurality of mixing elements 31 in close tolerance position relationship with respect to the internal side wall 32 of the housing to assure that the majority and preferably all of the fluid flowing through the housing passes through the respective mixing elements. The mixing elements are mounted in the housing 30 on a connecting rod 33, which is secured to the housing 30 by one or more sealed nut or like connections 34 with an external rod portion 35 coupled to the vibrating generator 23. The mixing elements 31 have central openings through which the connecting rod 33 passes and are mounted on the latter separated by respective spacers 36 in fixedly secured position by nuts 37 engaging the illustrated threads on the connecting rod. The rod 33 also represents generally an illustrative net axial direction in which fluid flows to pass through the housing. The mixing apparatus 10, moreover, importantly includes between respective mixing elements 31 and between the last mixing element closest the outlet 17 respective relatively open mixing chambers 38 in which the individual flow streams formed by the respective mixing elements may generally turbulently shear and otherwise mix to form ultimately the relatively long-lasting, homogeneous mixture effluent exiting the outlet 17 of the housing 30. The axial depth along rod 33 of the chambers 38 may be varied, as desired; generally the larger the flow rate of fluid through the mixing device 10, the larger should be the depth of the chambers 38. The heater 24 is illustrated in FIG. 2 as an electric resistance heating wire preferably of the electrically insulated type to avoid direct electrical contact with the housing 30, with a switch 39 for completing an electrical circuit between the battery 22 and the heater 24 to supply heat as aforesaid. The large surface area interfacial contact between the fluid material flowing through the mixing apparatus 10 and the various rigid surfaces of the latter and the turbulence with which the fluid engages such surfaces assures an extremely efficient thermal energy transfer therebetween.

Each mixing element 31 is formed of a generally flat plate 40 and a fluted, somewhat dished disc 41, as shown in detail in FIGS. 3–6 which illustrate in connection with FIGS. 1 and 2 the most preferred embodiment or best mode of the invention. Preferably the plate 40 and disc 41 are formed of copper or of stainless steel, such as No. 316 stainless steel for good fatigue resistance, especially in those instances that the mixing elements are to be vibrated ultrasonically. However, other materials also may be used, such as, for example, plastics, plastic-like materials, other metal materials, etc. The plate 40 preferably is flat and has a circular circumference for close tolerance positioning against the interior generally cylindrical wall 32 of the housing 30. The plate 40 also has an array of outlet holes 42, eight of them being employed in the illustrated embodiment, for the purpose of discharging individual flow streams formed by the mixing element 31 into a mixing chamber 38 of the mixing apparatus 10. A central opening 43 through the plate 40 accommodates the connecting rod 33.

The disc 41 also is of generally circular circumferential configuration, as the plate 40, to fit closely against the internal cylindrical wall 32 of the housing 30, although if that wall were other than of cylindrical configuration, the external circumferences of the plate and disc could be correspondingly altered. The disc 41 is dished in a manner generally apparent from the isometric or perspective showing in FIG. 3. A central opening 44 accommodates the connecting rod 33 and is located generally at the apex of the dish or cone of the disc 41 such that when the latter is positioned with its exterior circumference is generally flat abutment with the plate 40, the opening 44 is spaced away from the plate. A plurality, in the illustrated embodiment eight, of tapered triangular cross-section, radially curving flutes 45 are formed in the disc 41, each having a relatively sharp edge 46 raised away from the plate 40 and tapering down to an apex 47 relatively proximate the plate 40 where the external surface 48 of the disc rises to a next sharp edge 46. Each flute 45, as illustrated, has a radius of curvature approximately equal to one-half the cross-sectional radius of the disc 41 and, acordingly, angularly curves approximately 180°.

Figure 5:
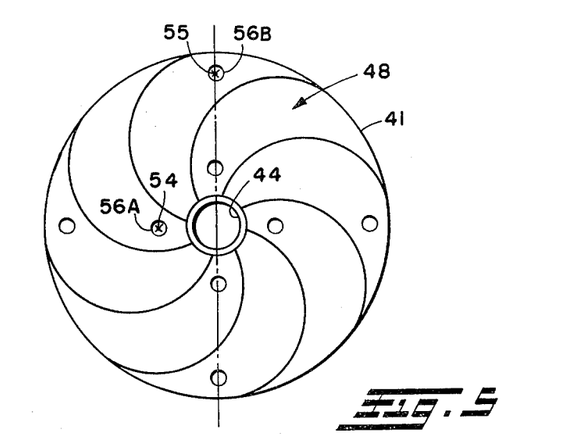
FIGS. 5 and 6 are, respectively, bottom and top plan views of the disc for a mixing element looking generally in the direction of the arrows 5—5 and 6—6, respectively, of FIG. 2.
Figure 6:
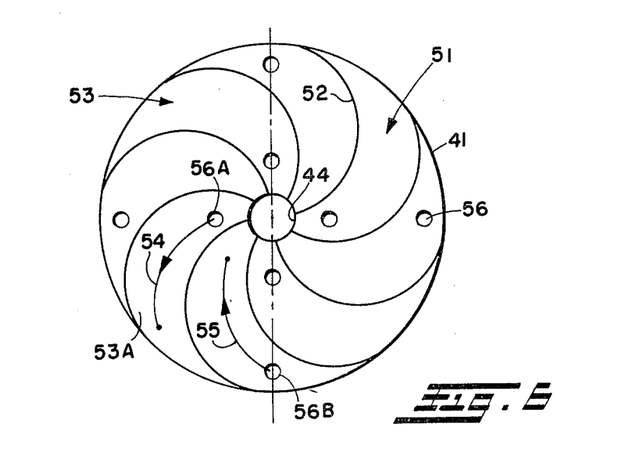

When assembled, the plate 40 and disc 41 are placed into abutment with each other with the central openings 43, 44 aligned relative to a common longitudinal axis 50 along which the connecting rod 33 extends. Several such mixing elements may be placed on the connecting rod 33, relatively separated by spacers 36, and the total combination, then, may be secured on the rod by the nuts 37. Although only three mixing elements are shown in FIG. 2, it is contemplated that approximately eight such mixing elements would be employed in the mixing apparatus 10, although more or fewer mixing elements may be used, as desired. The interior surface 51 of the disc 41, as is seen in FIG. 6, interior surface referring to the surface of disc 41 facing the plate 40, is formed similarly, but oppositely relative to the exterior surface 48 thereof, which is seen in FIG. 5. The interior surface 51 is generally dished, although the effectively raised walls or edges 52 thereof in cooperation with the plate 40 form isolated fluted channels generally represented at 53 along which fluid flows in isolated streams, for example, as shown by representative flow stream lines 54, 55. A plurality, in the illustrated embodiment eight, of inlet holes 56 through the disc 41 provide entry of fluid onto the respective fluted channels 53. As shown, four of the inlet holes are located at approximately equal radial distances from the longitudinal axis 50 for communication with alternate fluted channels 53. Similarly, the four remaining inlet holes 56 are located at a different equal radial distance from the longitudinal axis 50 for communication with the remaining alternate fluted channels 53. Preferably the inlet holes 56 are located in the exterior surface 48 of the respective flutes 45 relatively proximate the respective apexes 47 to assure maximum fluid collection by the inlet holes, thereby avoiding any stagnation or collection of fluid without passage of the same through the inlet holes into the mixing element 31. Moreover, the outlet holes 42 through the plate 40 are oriented similarly, but oppositely relative to the inlet holes 56 of the disc 41 so that fluid entering, for example, the inlet hole 56A and flowing down through the fluted channel 53A formed between the disc 41 and plate 40 will exit the outlet hole 42A into a chamber 38, as is illustrated by the stream line 54 in FIGS. 3 and 6, for example. Similarly, the stream line 55 enters the outer radial inlet hole 56B, flows radially inwardly, i.e. in an opposite radial direction relative to that of the stream line 54 in the fluted channel 53A, through fluted channel 53B and upwardly out through the radially inwardly located outlet hole 42B of plate 40. Thus, it will be appreciated that the two flow streams flowing through adjacent fluted channels 53 will, as they exit respective outlet holes 42 of plate 40, have generally opposite rotational vectors and, accordingly, oppositely directed rotational inertia or rotational momentum that enhances the shear between respective streams and the turbulent mixing of them in respective chambers 38.

Figure 3:
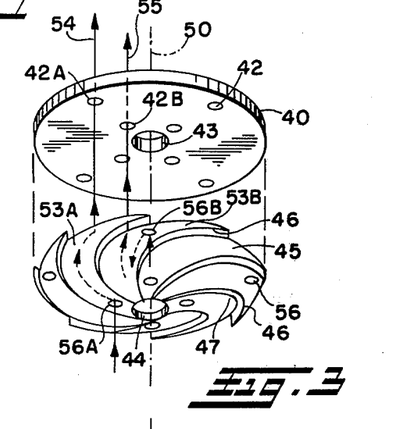
FIG. 3 is an exploded isometric view of one mixing element used in the mixing apparatus of FIG. 2.
Figure 4:
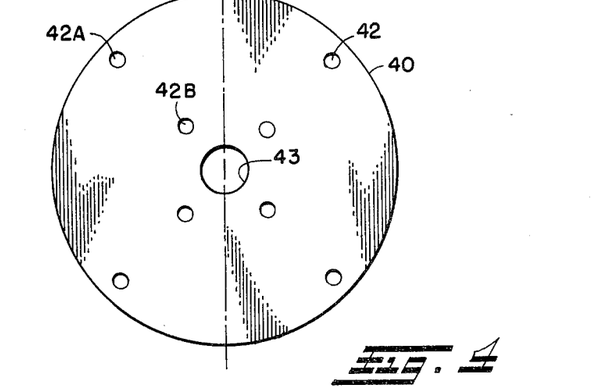
FIG. 4 is a bottom plan view of the plate of a mixing element of FIG. 2 looking generally in the direction of the arrows 4—4 thereof.

From the foregoing, it will be appreciated that each mixing element 31 initially divides the fluid input thereto into eight separate streams such as those represented by the stream lines 54, 55. Looking at the flow stream line 54, for example, that stream initially makes a 90° bend as the fluid passes through the inlet hole 56A, each bend effecting a mixing turbulence in the stream and in some instances a criss-crossing of the respective boundary layers thereof for maximum mixing homogeneity, and commences its flow down through the fluted channel 53A. The tapering of the fluted channel 53A, moreover, effects a twisting action of the stream 54 about the flow axis of such stream. Furthermore, the radial curvature of the fluted channel 53A bends the flow axis of the stream 54 flowing therealong to impart to that stream a rotational inertia or rotational momentum as it exits the plate 40 through the outlet hole 42A. Too, a right angle bend is effected in the flow stream as it leaves the channel 53A and passes through the outlet hole 42A.

The multiple direction changes, the bending of the flow axis by about 90°, and the twisting of the flow stream all contribute to the thorough mixing in the individual flow streams passing through the mixing element 31, and the oppositely directed flow streams exiting from plate 40, then, turbulently mix in the respective chambers 38 to assure effective mixing operation. Since the direction changes occur normally without substantial backflow or reverse direction flow of the streams immediately back upstream in the housing 30, the back pressure in the mixing apparatus 10 is minimized. Furthermore, between adjacent fluted channels 53 in the dished surface 51 of the plate 41, there may be space provided for communication between adjacent, but oppositely directed or counter-rotating, flow streams. Such communication effects an interfacial shearing as the two oppositely directed streams pass, still further enhancing the mixing effectiveness. The mixing element 31 also radially displaces fluid whereby fluid that is generally near the rod 33 upstream of the mixing element is moved outward near the wall 32 at the downstream end and vice versa further enhancing the mixing effectiveness of the apparatus 10. Thus, the four inner streams formed by the mixing element 31 are radially transposed with respect to the four outer streams.

During operation of the mixing apparatus 10, fluid is delivered from a supply generally indicated at 59 to the inlet 13 where it enters the lower chamber 60 of the housing 30. The first mixing element 31 divides the fluid flowing from chamber 60 into eight generally laminarly flowing streams that undergo multiple directional changes and ultimately enter the first mixing chamber 38 where generally turbulent mixing occurs. From the first chamber 38, the fluid again is divided by the next mixing element 31 into eight streams again, and so on until ultimately a substantially homogeneous mixture effluent is provided the outlet 17 of the mixing apparatus 10. In the preferred embodiment, two fluids are mixed, namely fuel and water, from eight to about twelve mixing elements are employed, and about eight streams are formed in each mixing element. With that data the above stratification S equation can be solved to find that the theoretical size of the respective strata in the final mixing chamber 38 just prior to the outlet 17 is on the order of about $\frac{1}{2}$ angstrom, there being about 260 million layers, and such theoretical dimension is smaller than that of a water molecule. Therefore, an extremely effective mixing of the water with the fuel is assured.

Additionally, the many layers formed in the mixing apparatus 10 assures excellent skin contact with the various surfaces of the mixing elements 31, which may be vibrated by the generator 23 and connecting rod 34, to assure good coupling of the vibration energy to the fluid.

Also, the edges 46 of the flutes 45 of the disc 41 effect a shearing action of fluid engaging the same further to divide or break up the individual flow streams in the respective mixing chambers 38, still further increasing the mixing efficiency of the mixing apparatus 10.

Figure 7:
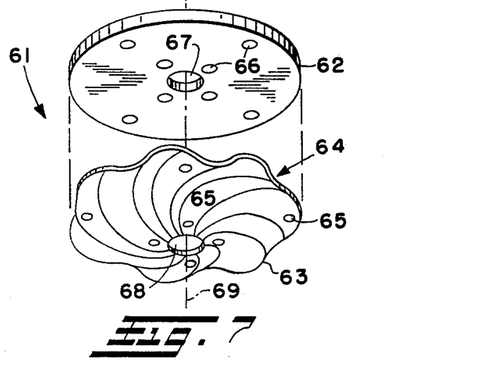
FIG. 7 is an exploded isometric view of another mixing element in accordance with the present invention.

In FIG. 7 is illustrated a modified alternate mixing element 61, which may be substituted in the mixing apparatus 10 for the respective somewhat similar mixing elements 31 described above. The mixing element 61 also includes a plate 62 similar to the plate 40 above and a disc 63, which is, to an extent, dished or in a hollow truncated conical-like form in the manner of the disc 41 described above but in this case is formed with a plurality of corrugations to form with the plate 62 a plurality of corrugated channels 64. A plurality of inlet holes 65 in the disc 63 are formed at respective radial locations in the same manner as the inlet holes 56 and a plurality of outlet holes 66 in the plate 62 also are similar to the outlet holes 42 above. The plate 62 and disc 63 also have respective central openings 67, 68 concentric about a common longitudinal axis 69 to receive the connecting rod 33, as above. When assembled, the plate 62 and disc 63 are placed into tight engagement and effect a similar or equivalent flowing and mixing operation of the streams flowing therethrough as above. However, the truly curved sides of the respective corrugations and corrugated channels 64 of the disc 63 providing the smoothness of the mixing element 61 minimizes back pressure in a mixing apparatus; and to that extent the embodiment illustrated in FIG. 7 is preferred over the mixing element 31. However, it has been found that the mixing disc 41 provides more effective shear between the mixing elements and effective twisting of fluid in the mixing elements than the convoluted disc 63, so to these extents the mixing element 31 is preferred over the mixing element 61.

Although the mixing apparatus 10 and mixing element 31 are shown in FIGS. 1, 2 and 3 in position for vertically upward flow of the fluids therethrough and the mixing element 61 is similarly illustrated in FIG. 7, such parts may be reversed to obtain vertically downward flow of fluids therethrough. The disadvantage to the latter in a vehicle system, though, would be in the delay that might be encountered when starting the vehicle and awaiting sufficient fluid flow to reach the engine. Also, it will be appreciated that the mixing element 31 as well as the other mixing elements of the invention may divide the flow into more or fewer than eight streams.

Figure 8:
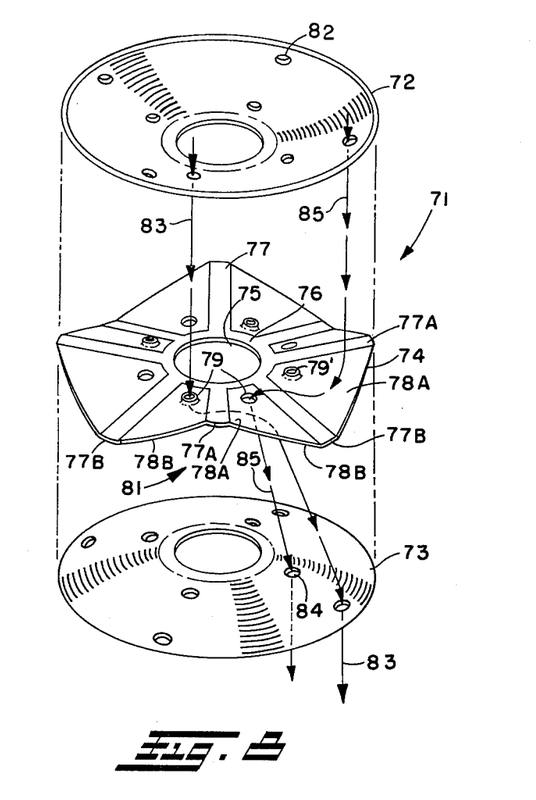
FIG. 8 is an exploded isometric view of still another mixing element in accordance with the invention.
Figure 9:
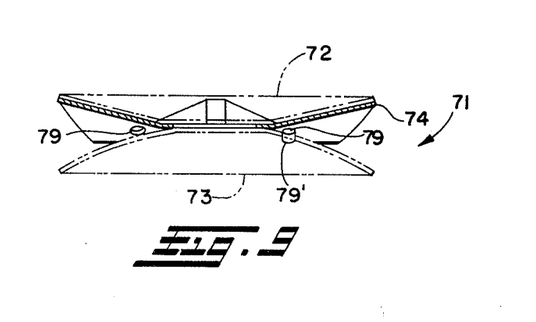
FIG. 9 is a side elevation view, partly in section, of the assembled mixing element of FIG. 8.

Referring now to FIGS. 8 and 9, a further modified or alternate mixing element 71, which may be substituted for the above-described purposes in the mixing apparatus 10 of FIGS. 1 and 2, for example, to produce equivalent mixing function, includes a three-part sandwich of upper and lower dished plates 72, 73 and a central disc part 74. The mixing element 71 has lower tolerance requirements than the other mixing elements hereof, therefore is easier to manufacture on a small scale basis, and to that extent is preferred. The disc 74 has a central opening 75 circumscribed by a generally planar ring-like annulus or shoulder 76. The disc 74 is corrugated in a fashion such that rib-like portions 77 extend radially from the annulus 76 alternately in respective directions upward and downward from the annulus plane, as shown. Between respective ribs 77 are generally planar surfaces 78, these being, of course, slightly curved enabling them to meet the annulus 76 so that the entire disc 74 may be formed out of a single stamped part, for example. Preferably the disc 74 is stamped from a single circular flat disc to form the convoluted shape thereof and has eight such ribs 77, eight planar surfaces 78, and eight flow through holes 79 through respective planar surfaces, with alternate ones of those openings being punched to form a surrounding ridge 79' extending alternately upward or downward relative to the illustration of FIG. 8. Plate 72 is dished in a manner to form with alternate upwardly directed ribs 77A respective upper fluid chambers, such as the fluid chamber 80 that would be formed between the bottom surface of plate 72, ribs 77A in the lower right-hand quadrant of the illustrated disc 74, and planar surfaces 78A. Similarly, plate 73 is dished upwardly to mate with ribs 77B to form four lower fluid chambers, such as the one illustrated at 81 in the lower central quadrant of the illustrated disc 74 with the surfaces 78B.

The plate 72 includes eight inlet holes 82 therethrough, four of which are located relatively close to the center of the plate and four of which are radially spaced further outward from the plate center. The radially inward inlet holes 82 align with the upwardly punched flow through holes 79 of the disc 74 so that fluid passing downwardly through those inlet holes 82 also passes downwardly through those upwardly punched flow through holes 79, for example into the flow chamber 81 illustrated with respect to a flow stream 83. Such alignment and sandwich-like configuration of the mixing element 71 is more clearly seen in FIG. 9. As shown, such flow stream 83 will pass under planar surfaces 78B in flow chamber 81 while also curling over the upper surface of plate 73 until that flow stream ultimately exits through a respective radially outwardly located outlet hole 84 in plate 73. It will be understood that as the flow stream 83 follows that flow path, it will undergo two right angle direction changes, will tend to curl or curve in the flow chamber 81 to impart a rotational inertia to the flow stream exiting the outlet hole 84 for turbulent mixing in a mixing chamber 38 of the mixing apparatus 10 described above with reference to FIGS. 1 and 2 above. Flow streams, such as the one illustrated at 85, passing through one of the outer radial inlet holes 82 of plate 72 is directed into an upper flow chamber, such as the flow chamber 80 where it also undergoes two right angle changes in direction, a change in momentum as it flows down one planar surface 78A and up the next while tending to curl or rotate as it ultimately enters through one of the downwardly punched flow through holes 79 from which it passes directly through one of the inner radial outlet holes 84 of the lower plate 73. Thus, as above, the mixing element 71 divides the flow coming in from the top thereof into eight flow streams, four of which are moved from radially outward positions relative to the center of the mixing device flow through upper flow chambers 80 such that they encounter multiple direction changes and rotational inertia as well as a repositioning to a radially inward portion of the mixing device as they exit through downwardly punched holes 79 and outlet holes 84, as shown, for example, by the flow stream 85. Similarly, the four inner flow streams, such as the flow stream 83, flow through the lower flow chambers 81, also undergoing multiple direction changes and having imparted thereto a certain amount of rotational inertia while they are displaced to radially outward positions in the mixing device passing through the plate 73 at the radially outward holes 84 thereof. Moreover, since the flow streams 83, 85 actually flow in opposite directions through their respective flow chambers, the rotational inertia imparted to them where they exit the lower plate 73 will generally be in opposite directions for enhanced turbulent mixing in the mixing chambers 38.

Each of the mixing elements described above, as well as those described hereafter, may include at least one part formed of a material, i.e. a substrate, that degrades with the flow of fluid through the mixing device to provide one or more desired additives in the fluid. In this regard, the mixing element 71 with its three-part sandwich construction is preferred. The disc 74 may comprise such degradable material, whereas the plates 72, 73 may comprise non-degradable material. Therefore, the plates 72, 73 will provide containment for the disc 74 as it degrades and will assure at least some mixing action and separation between respective mixing chambers 38 even if one such disc 74 fully degrades prematurely.

A mixing device was constructed generally in accordance with the mixing device illustrated at 10 in FIG. 2 including a housing 30, a connecting rod 33, a plurality, namely 12, of mixing elements 71 in the form illustrated in FIGS. 8 and 9 (instead of the mixing elements 31 shown in FIG. 2), a fluid inlet and a fluid outlet, and this mixing device was satisfactorily used, as follows. The housing was about 6 inches long and cylindrical with a diameter of about 1½ to 2 inches. Attached to the mixing device was a conventional solenoid pulsing device that applied vibratory pulses to the connecting rod 33 at a frequency of approximately 120 hertz. The fluid flowing through the mixing device flowed in a downward direction, with the fluid inlet at the top and the fluid output at the bottom, and the latter was connected directly to the carburetor of a four-cycle, several horsepower, internal combustion engine ordinarily used on a snow blower.

Initially, 200 cc. of regular octane (about 91 average octane) gasoline was poured into a holding tank. From the holding tank that gasoline was passed through the mixing device directly into the carburetor. The engine was started, and it ran for approximately eight minutes at a constant throttle setting of about 70%. While the engine was running, it achieved a relatively high temperature and a relatively significant amount of visible and odorous exhaust was produced. The engine stopped when its fuel supply was depleted.

The condition of the engine sparkplug was examined prior to further operation of the engine and the sparkplug found to be fouled. Then, about 190 cc. of gasoline and about 10 cc. of water, the latter including approximately 30% methanol, although the inclusion of methanol is believed unnecessary for proper operation of the engine, were poured into one container and from such container into the mentioned holding tank. While the mixing device was being vibrated at approximately 120 hertz, the engine was started from a warm up condition substantially as in the above-described prior test. The water, gasoline, and methanol mixture was mixed by the mixing device and fed by the force of gravity to the engine carburetor. This time the engine ran for approximately twelve and one-half minutes until it depleted its fuel mixture supply at the same throttle setting as above. During such operation, there was a substantial reduction in the exhaust odor, a noticed reduction of about 10 to 15 degrees F. in the exhaust temperature stream measured about 3 to 4 inches from the engine exhaust port, and a cleaning of the exhaust so that it was nearly invisible. Moreover, during such operation the engine clearly appeared to run at a faster speed. The sparkplug was examined after the latter test, and there was clearly a marked cleaning of the electrode. During the latter test one problem was encountered, this being the apparent agglomeration of water particles in the mixing apparatus apparently due to the stagnating of water at relatively low lying areas of the respective flow chambers of the mixing elements 71. Nevertheless, the engine ran quite properly without any sputtering or tendency to stall as those periodic droplets of BB size were delivered at a rate of approximately one every ten seconds, through the carburetor to the engine.

Thus, in the foregoing test, approximately 2 to 7% by volume of water was mixed with gasoline to provide ultimately a substantially increased operating efficiency of the engine including, particularly, an unexpected increase in the operating time of the engine. Further, it is believed that additional amounts of water may be combined with the gasoline to form an emulsion having up to about 30% by volume of water as an ingredient. The emulsion formed by the mixing apparatus in the above-mentioned test, moreover, appeared to hold up for about three minutes, which ordinarily would be more than adequate for use in an automobile engine, for example.

Although the mixing device described above in the test was vibrated the mixing devices according to the invention would be useful to mix fluids adequately without such vibration, it being appreciated that variations in the flow rates, dimensional parameters of the mixing device, number of streams formed by and the number of mixing elements, etc. can be varied to achieve the desired mixing.

It will be appreciated that although the size and number of the holes in the respective mixing elements disclosed herein; the width, length, depth and like parameters of the channels formed in each mixing element; the size and number of the mixing elements and spacing therebetween, and so on all may affect the mixing accomplished by a mixing device in accordance with the invention wherein fluid is divided into plural streams, each has its direction changed at least twice, and the streams then are turbulently mixed, these parameters may be varied as desired to obtain desired mixing results.

Figure 10:
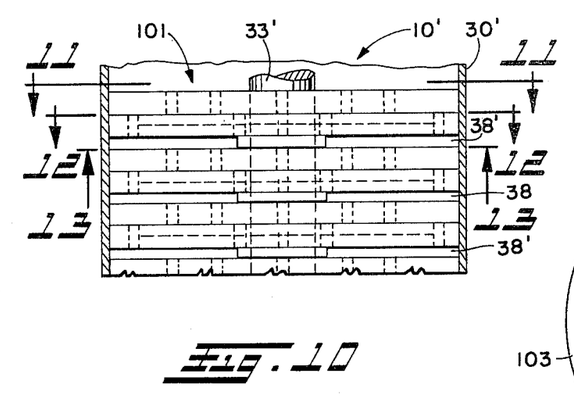
FIG. 10 is a side elevation view, partly broken away in section, of a further plurality of mixing elements in a housing of another mixing apparatus in accordance with the invention.
Figure 11:
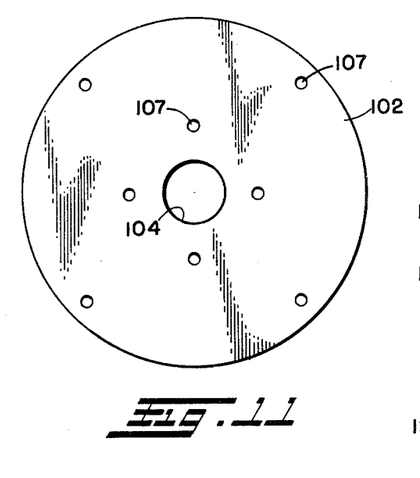
FIG. 11 is a top plan view of the plate of a mixing element looking generally in the direction of the arrows 11—11 of FIG. 10.
Figure 12:
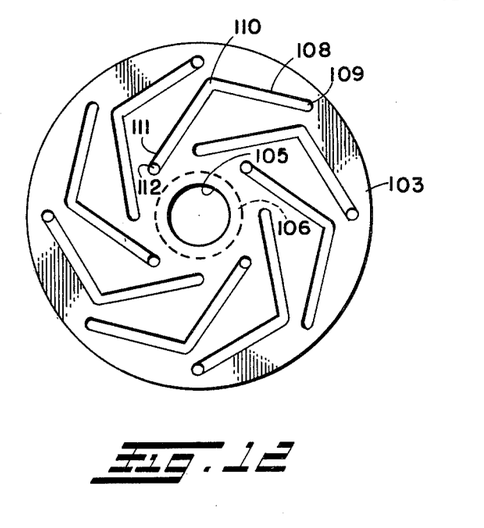
FIGS. 12 and 13 are, respectively, top and bottom plan views of the disc of a mixing element looking generally in the direction of the arrows 12—12 and 13—13, respectively, of FIG. 10.
Figure 13:
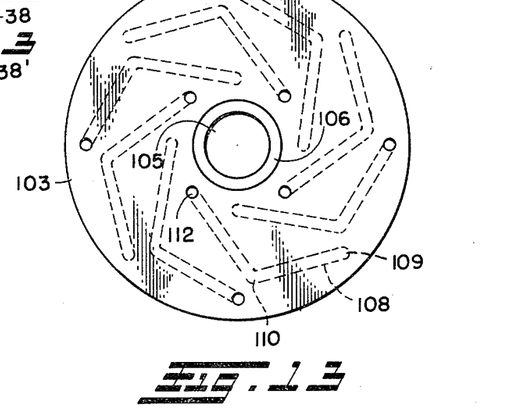

In accordance with the invention, the most preferred embodiment considering ease of manufacturing is illustrated in FIGS. 10-13 in which the mixing device 10', only a portion of which is illustrated in FIG. 10, is similar to the mixing device 10 described above with reference to FIGS. 1 and 2, but includes a plurality of modified mixing elements 101. The mixing device 10' includes, as before, a housing 30', a connecting rod 33', and a plurality of mixing chambers 38' between the respective mixing elements 101.

Each of the mixing elements 101 includes a plate 102 and a disc 103, which are held firmly in abutment and in a particular alignment fashion, with the latter function being obtained, for example, by a conventional keying technique, not illustrated. The plate 102 and disc 103 have central openings 104, 105, respectively to receive the connecting rod 33', as above, and the disc 103 also has a depending annular shoulder 106 on its surface facing away from the plate 102. The annular shoulder 106 circumscribes the opening 105 and provides a spacing function analogous to that provided by the spacers 36 described above, namely the provision of the mixing chambers 38' between adjacent mixing elements 101 in the mixing device 10'.

Through the plate 102 are eight fluid inlet holes 107, four of which are located at a relatively small radial distance from the center of the plate and four of which are located radially further from the center thereof. In the disc 103, are eight dog-leg-like channels 108, each of which has an inlet end 109, which aligns with a respective inlet hole 107 of the plate 102; a bend 110; an outlet end 111; and an outlet hole 112. Preferably the angle of the bend 110 defined between the inlet and outlet ends of each channel 108 is more than an acute angle to maintain the laminer flow characteristics of the fluid therein and to obtain in effect a cross-flow shearing and twisting of the flow stream through a channel as, for example, the fluid boundary layer along one side of the inlet end of the channel crosses over and confronts, as well as, to an extent, switches geometrical positioning with respect to the fluid boundary layer flowing along the opposite side of such inlet end at the bend 110. Further, preferably each channel has a depth of approximately ½ the thickness of the disc 103, and, moreover, the distance or depth of each mixing chamber 38' between adjacent mixing elements 101 is about the same as the channel depth. Such proximity of adjacent mixing elements promotes shear in the respective mixing chambers 38'. Moreover, preferably the inlet holes 107 of one mixing element do not align with the outlet holes 112 of the next adjacent mixing element to avoid straight-through channeling of fluids through the mixing chambers 38'. Accordingly, the fluid in the mixing chambers 38' will have to seek its own path to the next mixing element, thus obtaining good turbulence and shear in each mixing chamber, reducing channeling, and avoiding stagnant areas at which water particles, for example, may collect and/or agglomerate. The channels 108 further operate to bring a flow stream entering the same from a respectively outer or inner radial inlet hole 107 of the plate 102 to the opposite respective inner or outer radial position of the outlet holes 112 in the disc 103.

In operation of the mixing device 10' fluid enters the initial chamber thereof and then passes, either downwardly or upwardly, if desired, such that one fluid stream divided from the main body of fluid enters an outer radial inlet hole 107 and into the inlet end 109 of a channel 108. That flowing action effects a flattening of the flow stream. Moreover, the flow stream undergoes a right angle bend as it begins its flow down through the inlet end of channel 108 toward the bend 110, bends again at the such bend, and undergoes another right angle bend at the outlet hole 112 at a relatively inner radial position of the disc 103 where that flow stream then enters the appropriate mixing chamber 38'. Turbulent mixing occurs in the mixing chamber 38', and the fluid therein again divides into plural flow streams in the next mixing element 101 or after exiting the last mixing element exits the housing 30'. Similarly, a flow stream entering one of the inner radial inlet holes 107 of the plate 102 ultimately will be brought by a respective channel 108 to a relatively outer radial position outlet hole 112 of the disc 103.

The mixing elements 101 and the mixing device 10' are preferred in view of the foregoing and, especially, due to their relative ease of manufacturing compared to the more complex discs described above. Moreover, the mixing elements 101 assure relatively constant cross-section flow streams and facilitate control of the various flow paths to assure that they are all substantially equal, thereby preventing the occurrence of a more preferential path through the mixing device 10'. If desired, the plate 102 and/or disc 103 may be formed of molded material and may have an outer circumference which is slightly larger than the inner circumference of the housing 30' to assure a good seal therewith. The disc 103 may be formed of plastic, ceramic materials, metal, or other materials. The disc similarly may be formed of those materials, although metal is preferred for the strength of the mixing element and to provide electro-static stabilization, if necessary.

Although the mixing elements 101 are illustrated with eight flow paths therethrough, additional channels and inlet holes may be provided in the disc 103 and plate 102 respectively. Furthermore, if desired, for example to reduce the flow restriction effect of the mixing elements 101, additional channels may be formed in the bottom surface of the disc 103, the annular shoulder 106 removed, the disc itself thickened, if necessary, and an additional plate similar to the plate 102 provided against such surface to provide a three-part sandwich mixing element having, for example, sixteen or even more flow paths therethrough.

Figure 14:
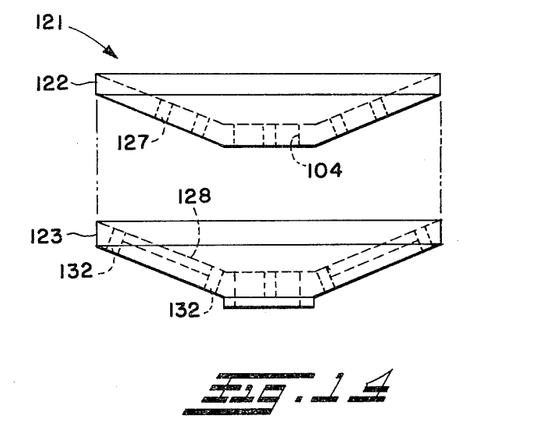
FIG. 14 is an exploded elevation view of a modified dished mixing element similar to those illustrated in FIGS. 10-12.

In FIG. 14 is illustrated an alternate form 121 of the mixing element 101. The alternate mixing element 121 includes a plate 122 that is similar to the plate 102, except for its generally dished shape, and a disc 123, which also is similar to the disc 103 except for the dished shape illustrated. The inlet holes 127, channels 128, and outlet holes 132 in the disc are all similar in form and function to those described above with respect to the mixing element 101. The dished shape of the mixing element 121, however, further reduces the possibility of encountering any stagnation or places at which water particles may collect and/or agglomerate, for such water particles would, at the least, move toward the area of lowest potential energy or gravity, e.g. toward the center of the mixing element where the connecting rod penetrates the same for pick up by respective inlet holes 127.

Although each of the above-described mixing elements would work in a mixing device described with fluid flowing in the preferred described direction, it will be appreciated that each also will work with fluid flowing in the relatively opposite direction through the mixing element. Moreover, although the preferred form of the invention employs eight stacked mixing elements in a housing, it will be appreciated that fewer or more mixing elements may be employed and fewer or more flow paths through each mixing element also may be employed within the spirit and scope of the invention. Of course, the dimensional parameters of the various components described above may be varied, as desired, to accommodate the particular fluid materials to be mixed by the mixing device. For example, relatively small-size flow paths may be used for relatively low viscosity materials; whereas larger-size parameters may be necessary to accommodate higher viscosity materials.

The embodiments of the invention in which an exclusive property or privilege is claimed are defined as follows:

1. A mixing apparatus, comprising a housing, a plurality of mixing means in said housing for effecting a mixing of a fluid-like material flowing therethrough, each of said mixing means including dividing means for dividing such fluid-like material into plural streams, and direction changing means for at least twice changing the flow direction of such streams normally without substantial immediate reverse directional flow thereof, chamber means in said housing for permitting generally turbulent mixing of such streams after exiting of the same from said mixing means, said housing having a generally axial flow direction in which net fluid flow occurs through said housing, support means for supporting said mixing means at axially spaced apart locations in said housing, and wherein said chamber means comprises a separate substantially completely open chamber means between each pair of adjacent plural mixing means for substantially unimpeded mixing of fluid therein.

2. The apparatus of claim 1, said housing being of elongate form.

3. The apparatus of claim 1, said housing being generally fluid-tight and having a fluid inlet and a fluid outlet.

4. The apparatus of claim 1, further comprising heater means for heating fluid flowing through said housing.

5. The apparatus of claim 4, wherein said heating means comprises an elongate heating coil wrapped about at least a portion of said housing.

6. The apparatus of claim 1, wherein each of said mixing means is positioned in relatively fluid-tight relation with respect to said housing such that fluid flowing through said housing must flow through each of said mixing means.

7. The apparatus of claim 1, further comprising means for separating adjacent ones of said mixing means.

8. The apparatus of claim 1, further comprising input means for delivering fluid into said housing for mixing by such mixing apparatus.

9. The apparatus of claim 1, wherein said fluids comprise a combustible fuel and water.

10. The apparatus of claim 9, wherein said combustible fuel comprises gasoline.

11. The apparatus of claim 1, wherein said direction changing means includes means for changing the flow direction of such streams at least at two substantially right angles.

12. A mixing apparatus, comprising a housing, at least one mixing means in said housing for effecting a mixing of a fluid-like material flowing therethrough, said mixing means including dividing means for dividing such fluid-like material into plural streams, and direction changing means for at least twice changing the flow direction of such streams, chamber means in said housing for permitting generally turbulent mixing of such streams after exiting of the same from said mixing means, and vibrator means to apply vibrational energy to fluid flowing through said housing.

13. The apparatus of claim 12, wherein said vibrator means comprises a vibrator coupled to at least one of said housing and said mixing means.

14. The apparatus of claim 12, wherein said vibrator means applies vibrational energy at a frequency of from about one hertz to ultrasonic frequency.

15. A mixing apparatus, comprising a housing, at least one mixing means in said housing for effecting a mixing of a fluid-like material flowing therethrough, said mixing means including dividing means for dividing such fluid-like material into plural streams, and direction changing means for at least twice changing the flow direction of such streams, and substantially open chamber means in said housing for permitting generally unimpeded turbulent mixing of such streams after exiting of the same from said mixing means, said housing having a net axial fluid flow direction therethrough, and said mixing means including means for transferring fluid from one radial location relative to such axis prior to entering said mixing means to another radial location relative to such axis upon leaving said mixing means.

16. The apparatus of claim 15, wherein said means for transferring includes means for transposing fluid in respective streams formed radially proximate and remote relative to such axis to radially remote and proximate locations relative to such axis, respectively.

17. The apparatus of claim 16, wherein said means for transposing comprises means for moving fluid from a plurality of streams formed radially proximate such axis to respective locations radially remote from such axis and fluid from a plurality of streams formed radially remote from such axis to respective locations relatively radially proximate such axis, said means for moving also angularly transposing each of said streams with respect to such axis.

18. A mixing apparatus, comprising a housing, at least one mixing means in said housing for effecting a mixing of a fluid-like material flowing therethrough, said mixing means including dividing means for dividing such fluid-like material into plural streams, and direction changing means for at least twice changing the flow direction of such streams at least at two substantially right angles, said mixing means including plural flow chambers and fluid inlet and fluid outlet passages for each flow chamber, said right angle direction changes occurring at the junctures of said flow chambers with said fluid inlet and fluid outlet passages, and chamber means in said housing for permitting generally turbulent mixing of such streams after exiting of the same from said mixing means.

19. The apparatus of claim 18, wherein said mixing means comprises plural fluid-tight elements, each having a flow passage therethrough and defining therebetween said channels.

20. A mixing apparatus, comprising a housing, at least one mixing means in said housing for effecting a mixing of a fluid-like material flowing therethrough, said mixing means including dividing means for dividing such fluid-like material into plural streams, and direction changing means for at least twice changing the flow direction of such streams, and chamber means in said housing for permitting generally turbulent mixing of such streams after exiting of the same from said mixing means, and wherein each mixing means includes plural flow chambers through which such streams flow and each flow chamber includes means for twisting the stream flowing therethrough to impart rotational inertia to such stream.

21. A mixing apparatus, comprising a housing, at least one mixing means in said housing for effecting a mixing of a fluid-like material flowing therethrough, said mixing means including dividing means for dividing such fluid-like material into plural streams, and direction changing means for at least twice changing the flow direction of such streams, and chamber means in said housing for permitting generally turbulent mixing of such streams after exiting of the same from said mixing means, and wherein each mixing means includes plural flow chambers through which such streams flow and each flow chamber includes means for rotating the stream flowing therethrough relative to its flow axis.

22. A mixing apparatus, comprising a housing, at least one mixing means in said housing for effecting a mixing of a fluid-like material flowing therethrough, said mixing means including dividing means for dividing such fluid-like material into plural streams, and direction changing means for at least twice changing the flow direction of such streams, and chamber means in said housing for permitting generally turbulent mixing of such streams after exiting of the same from said mixing means, and wherein each mixing means includes plural flow chambers through which such streams flow and each flow chamber comprises a channel having at least one bend therein.

23. A mixing apparatus, comprising a housing, at least one mixing means in said housing for effecting a mixing of a fluid-like material flowing therethrough, said mixing means including dividing means for dividing such fluid-like material into plural streams, and direction changing means for at least twice changing the flow direction of such streams, said mixing means including at least one disc and at least one plate cooperative to form plural flow chambers for flow of such streams therethrough, and chamber means in said housing for permitting generally turbulent mixing of such streams after exiting of the same from said mixing means.

24. The apparatus of claim 23, wherein said disc is dished.

25. The apparatus of claim 24, wherein said disc has plural curved flutes extending radially from a central portion thereof to a peripheral edge thereof.

26. The apparatus of claim 25, wherein said plate is flat and has a surface cooperative with walls of said curved flutes to form said chambers.

27. The apparatus of claim 25, wherein said plate has a surface cooperative with said disc to form said chambers, said plate having plate openings therethrough and said disc having disc openings therethrough, said plate and disc openings being positioned relative to said chambers to conduct fluid with respect to the same such that the streams flowing through adjacent chambers move in respective opposite directions.

28. The apparatus of claim 27, wherein the external surface of said disc facing away from said plate has sharp ridges forming apexes of respective flutes.

29. The apparatus of claim 28, wherein the interior surface of said disc facing said plate has relatively sharp ridges forming walls cooperative with said plate to form said chambers.

30. The apparatus of claim 27, wherein said disc has a substantially smoothly convoluted surface formation forming such chambers.

31. The apparatus of claim 27, wherein each of said chamber means includes a portion for direct communication with adjacent chamber means to permit interfacial shear between streams flowing therethrough.

32. The apparatus of claim 23, wherein said disc is of generally circular plan with a central portion defining a plane, said disc including plural arms extending radially from the center alternately angularly above and below such plane and plural substantially continuous surfaces between respective arms, whereby each surface extending between adjacent arms crosses such plane.

33. The apparatus of claim 32, wherein said mixing element comprises two plates, one on each side of said disc, each of said plates being dished to cooperate with respective arms and surfaces of said disc to form plural chambers on both sides of said disc.

34. The apparatus of claim 33, wherein said plates have plate openings and said disc has disc openings therethrough for conducting fluid into and from said chambers.

35. The apparatus of claim 34, wherein said disc openings and plate openings are cooperative to effect fluid flow through the chambers on one side of said disc in one angular and radial direction relative to said central portion thereof and in the chambers on the other side of said disc in opposite radial and angular directions relative to the first.

36. The apparatus of claim 33, wherein said disc is comprised of a material that is degradable in the fluid flowing in contact therewith to provide additive material to such fluid.

37. The apparatus of claim 23, wherein each chamber comprises a channel formed in said disc, and wherein said plate has a surface covering respective channels to maintain the substantial fluid-tight integrity thereof.

38. The apparatus of claim 37, wherein each channel has opposite ends, an opening through said disc at one end of each channel and an opening through said plate aligned with the opposite end of each channel, whereby fluid flows through said channels of said mixing means via respective openings associated with such channels.

39. The apparatus of claim 38, wherein each channel has plural generally linear portions and a distinct obtuse angular bend joining such linear portions.

40. The apparatus of claim 38, wherein said openings are positioned in said disc and plate such that fluid flows through relatively adjacent channels in relatively opposite directions.

41. The apparatus of claim 38, wherein said mixing element has a central portion and wherein said channels extend radially and angularly with respect to such central portion.

42. The apparatus of claim 38, wherein said openings in said disc and plate are positioned relative to said channels to direct fluid flow through relatively adjacent channels in relatively opposite directions while transposing fluid in respective streams formed at locations relatively proximate and remote from such central portion.

43. The apparatus of claim 38, wherein said plate and disc are flat.

44. The apparatus of claim 38, wherein said plate and disc are dished.

45. The apparatus of claim 23, wherein said mixing means comprises a plurality of the same, and wherein at least one of said plate and disc of each of said mixing means includes means for spacing the same in said housing from the next adjacent mixing means to form said chamber means between adjacent mixing means.

46. The apparatus of claim 23, wherein said housing has a generally cylindrical cross-section and each of said plate and disc has a generally circular plan with peripheral edges cooperatively related with respect to said housing to assure that substantially all of the fluid flowing through said housing must flow through said mixing means.

47. The apparatus of claim 23, wherein at least one of said plate and disc includes means for reducing stagnation of fluid flowing therethrough.

48. The apparatus of claim 23, wherein said plate and disc are substantially rigid.

49. The apparatus of claim 23, wherein said direction changing means comprises the inlet and outlet of each of said channels and is operative to effect such direction change at substantially right angles, each of said channels including means for changing the cross-sectional profile of fluid flowing therethrough, means for twisting fluid flowing therethrough to impart rotational inertia thereto, means for rotating the fluid flowing therethrough relative to the axial stream direction, and means for transposing the boundary layers of the stream of fluid flowing therethrough.

50. A method of mixing a fluid-like material, comprising delivering such material to a housing for flowing therethrough, dividing such flowing material into plural streams, at least twice changing the flow direction of such streams normally without substantial immediate reverse directional flow thereof, and permitting such streams to mix in a substantially completely open chamber in a generally unimpeded turbulent manner, thereby to form a well-mixed fluid-like material output.

51. The method of claim 50, wherein said step of at least twice changing comprises effecting a right-angle change in the flow direction of such streams.

52. The method of claim 50, further comprising bending each of such plural streams.

53. The method of claim 52, wherein said step of bending comprises smoothly bending.

54. The method of claim 52, wherein said step of bending comprises effecting a well defined angular bending of such streams at more than an acute angle.

55. The method of claim 50, wherein said dividing step comprises shearing fluid to direct the same into respective streams.

56. The method of claim 50, further comprising repeating for a plurality of times and in sequence said steps of dividing, at least twice changing, and permitting.

57. The method of claim 50, further comprising heating such material as it flows through such housing.

58. The method of claim 50, wherein said step of delivering comprises delivering fuel and a supplemental fluid to such housing.

59. The method of claim 58, wherein said step of delivering comprises delivering gasoline and water.

60. A combustion engine system for producing a mechanical output in response to a combustion process, comprising: combustion engine means for producing such mechanical output in response to combustion of a fluid-like material therein, fuel supply means for supplying combustible fuel, supplemental fluid supply means for supplying a supplemental fluid, mixing apparatus means for mixing such fuel and supplemental fluid, including a housing, input chamber means in said housing for receiving such fuel and supplemental fluid which form a combined fluid-like material, a plurality of mixing means in said housing for effecting a mixing of such material flowing therethrough, each including dividing means for dividing such combined material into plural streams, and direction changing means for at least twice changing the flow direction of each of such streams, and chamber means in said housing for permitting generally turbulent mixing of such streams after exiting of the same from said mixing means, and delivery means for delivering such mixed combined material to said combustion engine means for combustion thereat.

61. The system of claim 60, wherein said supplemental fluid comprises water.

62. The system of claim 60, wherein said mixing means further includes means for applying rotational momentum to such streams flowing through the same.

63. The system of claim 62, wherein the rotational inertia of such streams exiting respective mixing means at generally adjacent locations are in opposite directions.

64. The system of claim 60, further comprising means for applying thermal energy to said mixing means to heat the fluid flowing through the same.

65. The system of claim 60, wherein said combustion means includes combining means for combining with such mixed combined material air for combustion in said combustion engine means and wherein said delivery means comprises means for delivering such mixed combined material to said combining means.

66. The system of claim 60, wherein said mixing means includes means for controllably releasing an additive ingredient into the fluid flowing therethrough.

67. A method of mixing a fluid-like material, comprising delivering such material to a housing for flowing therethrough, dividing such flowing material into plural streams, at least twice changing the flow direction of each of such streams, bending each of such plural streams, twisting each of said flow streams about its flow axis, and permitting such streams to mix in a generally turbulent manner, thereby to form a well-mixed fluid-like material output.

68. A method of mixing a fluid-like material, comprising delivering such material to a housing for flowing therethrough, dividing such flowing material into plural streams, at least twice changing the flow direction of such streams, said dividing and at least twice changing steps including the flowing of fluid through a mixing element, effecting in such mixing element a counter-rotation shear of fluids passing therethrough, and imparting rotational momentum to each of said flow streams and permitting such streams to mix in a generally turbulent manner, thereby to form a well-mixed fluid-like material output.

69. A method of mixing a fluid-like material, comprising delivering such material to a housing for flowing therethrough, dividing such flowing material into plural streams, at least twice changing the flow direction of such streams, permitting such streams to mix in a generally turbulent manner, thereby to form a well-mixed fluid-like material output, and vibrating such material as it flows through such housing.

70. A method of mixing a fluid-like material, comprising delivering such material to a housing for flowing therethrough, dividing such flowing material into plural streams, at least twice changing the flow direction of such streams, permitting such streams to mix in a generally turbulent manner, thereby to form a well-mixed fluid-like material output, and radially displacing respective flow streams from the location at which they are formed to the location at which they are permitting to mix in such generally turbulent manner.

71. A method of mixing a fluid-like material, comprising delivering such material to a housing for flowing therethrough in a net axial direction, dividing such flowing material into plural streams, at least twice changing the flow direction of each of such streams, permitting such streams to mix in a generally turbulent manner, thereby to form a well-mixed fluid-like material output, and angularly displacing respective flow streams from the location relative to the net axial direction at which they are formed to the location at which they are permitted to mix in such generally turbulent manner.

72. A mixing apparatus, comprising a housing, at least one mixing means in said housing for effecting a mixing of a fluid-like material flowing therethrough, said mixing means including dividing means for dividing such fluid-like material into plural streams, and direction changing means for at least twice changing the flow direction of such streams at least at two substantially right angles, said mixing means including plural flow chambers and fluid inlet and fluid outlet passages for each flow chamber, said right angle direction changes occurring at the junctures of said flow chambers with said fluid inlet and fluid outlet passages, and chamber means in said housing for permitting generally turbulent mixing of such streams after exiting of the same from said mixing means, and wherein each flow chamber includes means for twisting the stream flowing therethrough to impart rotational inertia to such stream.

73. A mixing apparatus, comprising a housing, at least one mixing means in said housing for effecting a mixing of a fluid-like material flowing therethrough, said mixing means including dividing means for dividing such fluid-like material into plural streams, and direction changing means for at least twice changing the flow direction of such streams at least at two substantially right angles, said mixing means including plural flow chambers and fluid inlet and fluid outlet passages for each flow chamber, said right angle direction changes occurring at the junctures of said flow chambers with said fluid inlet and fluid outlet passages, and chamber means in said housing for permitting generally turbulent mixing of such streams after exiting of the same from said mixing means, and wherein each flow chamber includes means for rotating the stream flowing therethrough relative to its flow axis.

74. A mixing apparatus, comprising a housing, at least one mixing means in said housing for effecting a mixing of a fluid-like material flowing therethrough, said mixing means including dividing means for dividing such fluid-like material into plural streams, and direction changing means for at least twice changing the flow direction of such streams at least at two substantially right angles, said mixing means including plural flow chambers and fluid inlet and fluid outlet passages for each flow chamber, said right angle direction changes occurring at the junctures of said flow chambers with said fluid inlet and fluid outlet passages, and chamber means in said housing for permitting generally turbulent mixing of such streams after exiting of the same from said mixing means, and wherein each flow chamber comprises a channel having at least one bend therein.

75. A mixing apparatus, comprising a housing, at least one mixing means in said housing for effecting a mixing of a fluid-like material flowing therethrough, said mixing means including dividing means for dividing such fluid-like material into plural streams, and direction changing means for at least twice changing the flow direction of such streams at least at two substantially right angles, said mixing means including plural flow chambers and fluid inlet and fluid outlet passages for each flow chamber, said right angle direction changes occurring at the junctures of said flow chambers with said fluid inlet and fluid outlet passages, and chamber means in said housing for permitting generally turbulent mixing of such streams after exiting of the same from said mixing means, and wherein each channel includes means for changing the cross-sectional profile of the stream flowing therethrough.

76. A combustion engine system for producing a mechanical output in response to a combustion process, comprising: combustion engine means for producing such mechanical output in response to combustion of a fluid-like material therein, fuel supply means for supplying combustible fuel, supplemental fluid supply means for supplying a supplemental fluid, mixing apparatus means for mixing such fuel and supplemental fluid, including a housing, input chamber means in said housing for receiving such fuel and supplemental fluid which form a combined fluid-like material, at least one mixing means in said housing for effecting a mixing of such material flowing therethrough, including dividing means for dividing such combined material into plural streams, and direction changing means for at least twice changing the flow direction of such streams, and chamber means in said housing for permitting generally turbulent mixing of such streams after exiting of the same from said mixing means, and delivery means for delivering such mixed combined material to said combustion engine means for combustion thereat, and further comprising means for applying mechanical force to vibrate said mixing means and thereby to vibrate the fluid flowing through the same.

77. A method of mixing a fluid-like material, comprising delivering such material to a housing for flowing therethrough, dividing such flowing material into plural streams, at least twice changing the flow direction of such streams, imparting rotational momentum to each of said flow streams and permitting such streams to mix in a generally turbulent manner, said step of imparting including imparting to adjacent flow streams turbulently mixing in said housing a counter-rotating rotational momentum, thereby to form a well-mixed fluid-like material output.

* * * * *